US012769565B2

(12) United States Patent
Kandepu et al.

(10) Patent No.: US 12,769,565 B2
(45) Date of Patent: Oct. 20, 2026

(54) GENERATING CONSOLIDATED CUSTOMER INFORMATION QUESTIONNAIRE FOR DEPLOYMENT OF DISTRIBUTED TELCO CLOUD

(71) Applicant: Dell Products L.P., Round Rock, TX (US)

(72) Inventors: Anusha Kandepu, Bangalore (IN); Ramesh G, Chennai (IN); Joseph Lasalle White, San Jose, CA (US); Maunish A. Shah, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 37 days.

(21) Appl. No.: 18/669,951

(22) Filed: May 21, 2024

(65) Prior Publication Data

US 2025/0362935 A1 Nov. 27, 2025

(51) Int. Cl.
*G06F 9/445* (2018.01)

(52) U.S. Cl.
CPC .................................. *G06F 9/4451* (2013.01)

(58) Field of Classification Search
CPC ...... G06F 8/71; G06F 9/44505; G06F 9/4451; G06F 11/3051; G06F 15/177
See application file for complete search history.

(56) References Cited

U.S. PATENT DOCUMENTS

| | | | | |
|---|---|---|---|---|
| 12,182,151 | B1 * | 12/2024 | Federschmidt | G06F 16/168 |
| 2014/0258479 | A1 * | 9/2014 | Tenginakai | H04L 41/0889 709/220 |
| 2019/0243665 | A1 * | 8/2019 | Bolik | G06F 8/60 |
| 2022/0374402 | A1 * | 11/2022 | Hawkins | G06F 16/215 |
| 2024/0340658 | A1 * | 10/2024 | Parker | H04L 41/0856 |
| 2025/0315235 | A1 * | 10/2025 | Russell | G06F 9/5072 |

* cited by examiner

*Primary Examiner* — Hyun Soo Kim
(74) *Attorney, Agent, or Firm* — Amin, Turocy & Watson, LLP

(57) ABSTRACT

Described is technology that facilitates consistent deployment of cloud computing services, such as telco clouds, based on automatic consolidation and analysis of data corresponding to customer information questionnaires. An example method comprises ordering a set of customer information questionnaire (CIQ) files according to time stamps of the CIQ files, wherein the CIQ files specify configurations for deployment of a cloud computing service, and, based on the ordering, generating a consolidated CIQ file that comprises a consolidated set of the configurations defining deployment criteria for the cloud computing service.

20 Claims, 11 Drawing Sheets

HIGH-LEVEL INPUT-OUTPUT SCHEMATIC
400

GENERATING CONSOLIDATED CUSTOMER INFORMATION QUESTIONNAIRE FOR DEPLOYMENT OF DISTRIBUTED TELCO CLOUD

BACKGROUND

Various operations of a cloud computing system, including cloud computing hardware and/or software, can contribute to and/or be a detriment to environmental sustainability. As use of cloud computing continues to grow and expand, adoption of techniques to track and/or maintain focus for environment sustainability relative to cloud computing systems can be desired.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

Described herein are one or more frameworks directed to providing a dynamic customer information questionnaire (CIQ) based deployment template generation process for use in deploying cloud computing services, such as telco clouds.

An example system can comprise at least one processor; and at least one memory that stores executable instructions that, when executed by the at least one processor, facilitate performance of operations, comprising: ordering a set of customer information questionnaire (CIQ) files according to time stamps of the CIQ files, wherein the CIQ files specify configurations for deployment of a cloud computing service; and based on the ordering, generating a consolidated CIQ file that comprises a consolidated set of the configurations defining deployment criteria for the cloud computing service.

An example method can comprise based on an analysis of customer information questionnaire (CIQ) files, determining, by a system operatively coupled to at least one processor, configurations usable to deploy a cloud computing service, wherein the configurations comprise runtime attributes; and based on the configurations, generating a consolidated CIQ file that comprises a consolidated group of the configurations defining deployment criteria for the cloud computing service.

An example non-transitory computer-readable medium can comprise executable instructions that, when executed by a processor, can facilitate performance of operations. The operations can comprise identifying a failure associated with a computing operation of a cloud computing service when accessing the cloud computing service; and adjusting a consolidated CIQ file based on the failure, thereby overcoming the failure when the cloud computing service is re-deployed according to the consolidated CIQ file, wherein the consolidated CIQ file comprises configurations merged from at least two CIQ files, and wherein the configurations specify deployment criteria usable when deploying the cloud computing service.

An example benefit of one or more of the above-indicated method, system and/or non-transitory computer-readable medium can be an ability to provide a hardware, software and/or vendor agnostic deployment plan able to be employed generally absent being dependent on a single product, service, device, vendor and/or platform. In this way, it can be easier for a CSP to meet desired scale and/or deployment consistency requirements.

The dynamic updating ability of the one or more embodiments described herein can be provided by automatically generating and/or obtaining a notification of a change of an operating parameter of cloud networking equipment being employed or of a change to a key performance indicator being monitored either on the provider-end (e.g., provider of the cloud networking system) and/or at the user-end (e.g., user entity of the cloud networking system). The dynamic updating ability additionally and/or alternatively can be provided by automatically identifying and/or responding to a new CIQ file corresponding to the cloud computing service, Another example benefit of one or more of the above-indicated method, system and/or non-transitory computer-readable medium can be an ability to provide a proactive generation and updating of a consolidated CIQ file. This can be used to determine differences between deployed/not-yet-deployed telco clouds, during backup and/or restore of telco cloud configurations, for short-term disaster recovery by applying the last good known state of the telco cloud configuration, and/or in auditing of changes executed on a telco cloud over a specified time period. Relative to the last option, in one or more embodiments, the dynamic updating can be performed using trackable updates to allow for determination of the consolidated CIQ from different points in time.

Furthermore, any of the above benefits can be provided for a single telco cloud and/or for a cluster of one or more telco clouds. Where considering a cluster of telco clouds, determinations can be based on an identified exemplary telco cloud of the cluster and/or on an aggregation of information corresponding to two or more telco clouds of the cluster.

BRIEF DESCRIPTION OF THE DRAWINGS

The technology described herein is illustrated by way of example and not limited to the accompanying figures in which like reference numerals indicate similar elements.

DETAILED DESCRIPTION

Overview

Figure 1:
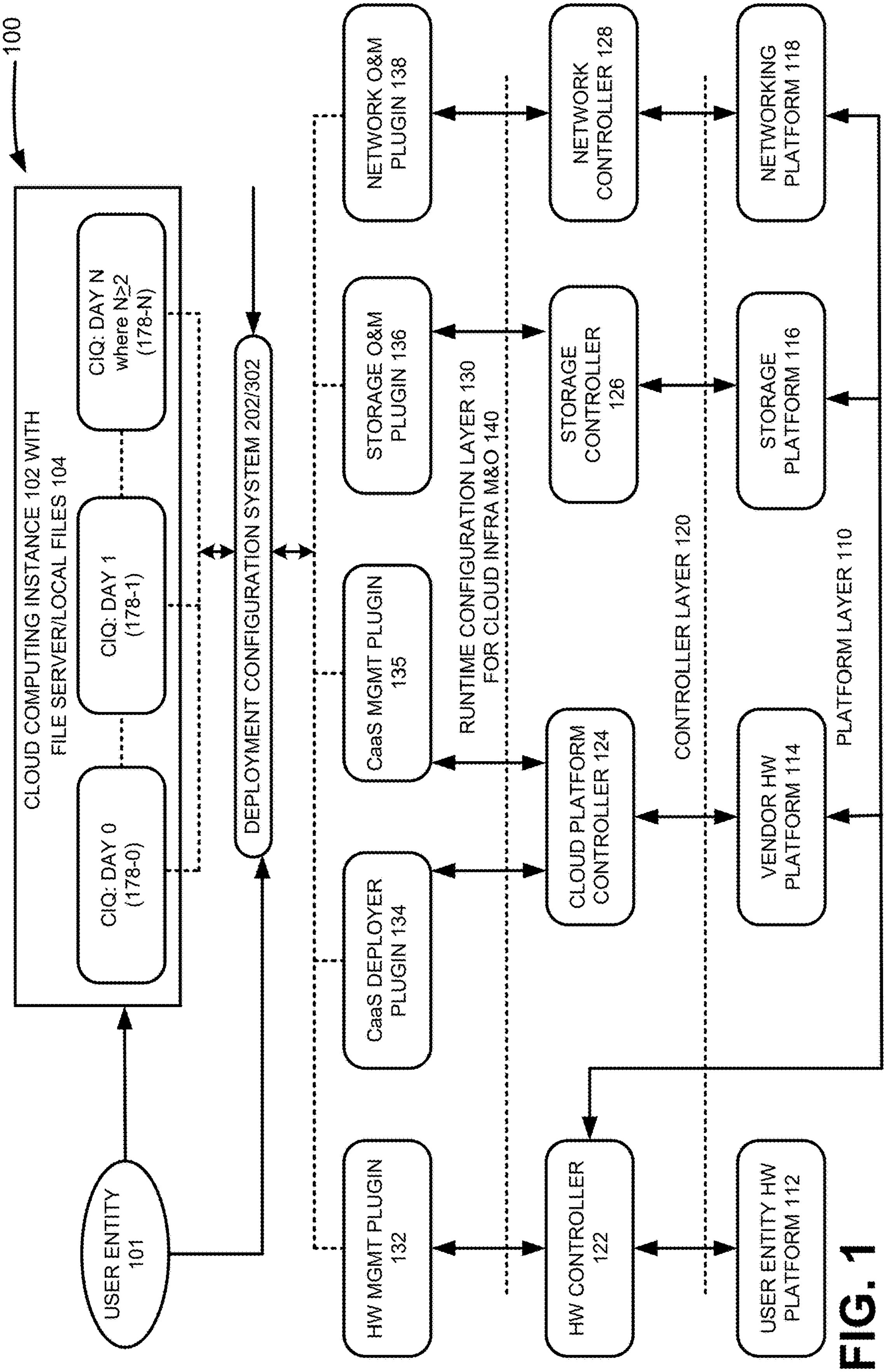
FIG. 1 illustrates a cloud computing service deployment architecture that can be employed by one or more non-limiting systems described herein, in accordance with one or more embodiments described herein.

The technology described herein is generally directed towards systems, methods and/or computer program products for facilitating deployment of a cloud computing instance by providing generation of cloud computing deployment plan.

As alluded to above, cloud service provider (CSP) entities can make a decision to migrate from legacy frameworks, such as existing telecommunication frameworks, to cloud-native, open and/or disaggregated frameworks. For such migration, these CSP entities often search for framework options that preserve choice while offering 5G capability, framework reliability and suitable total cost of ownership.

In one or more embodiments, a CSP entity can be a telecommunications or communication service provider, also referred to as a telco, that transmits information (e.g., data and/or metadata) electronically.

A migration can be accompanied by one or more challenges based on a scale of the migration. These challenges can include, but are not limited to, network density and/or complexity, automation, manageability, time to market and/or total cost of ownership. Network density and/or complexity can refer to a degree of interconnectedness among nodes and/or other aspects of a network. Network automation can refer to an ability to reduce and/or limit slow, labor-intensive operations that can negate cost, agility and/or scalability benefits of such modern frameworks. Network manageability can refer to the experience and/or skills often employed to manage a distributed network edge, for example. Network time to market can refer to how long it can take to migrate between frameworks. Finally, total cost of ownership can refer to cost of automation, manual labor, hardware, software, power and/or the like.

To meet scaling requirements of 5G and/or other associated challenges for deployment and manageability of telco infrastructure, CSPs can desire to employ one or more centralized management and orchestration (M&O) tools and/or automation capabilities. These M&O tools and/or automation capabilities can leverage customer information Questionnaire (CIQ) files for building (e.g., day 0 and/or day 1 operations) and/or managing (e.g., day 2+ operations) a distributed network, such as comprising and/or corresponding to a telco cloud.

However, existing M&O tools and/or automation capabilities cannot and do not generate consolidated CIQ files (e.g., files comprising an aggregation of CIQ data from two or more CIQ files). This issues extends to an inability of existing frameworks to obtain such CIQ data from an existing network (e.g., a telco cloud) which was built over multiple operations, such as employing a set of CIQ files (e.g., CIQ1, CIQ2. . . CIQn).

Further, even if such CIQ data is at least partially available, leveraging of such CIQ data to build a new telco cloud does not guarantee deployment consistency and/or configuration consistency with an existing telco cloud due to the dynamic nature of the existing telco cloud deployment process. This is the case where configuration, hardware and/or software changes are generated over a course of employment of two or more CIQ files, particularly where the deployment process comprises determining one or more of server boot order, hardware initialization by operating system, configuration of one or more storage disks, intellectual property assignment, etc., such as based on typical (e.g., existing) CIQ inputs. That is, the deployment process comprises a plurality of varied processes.

Put another way, generating a consolidated CIQ file by manually merging a set of two or more CIQ files is not an efficient and/or viable option and does not provide identical deployment with previously deployed telco cloud (also herein referred to as a cell site). Instead, manual merging of CIQ files can be manually intensive, tedious, and time consuming, thus also causing the manual merging to be error prone.

In view of the above, it can therefore be desired to provide a system and/or method for centralized management and orchestration of telco cloud deployment based on leveraging a plurality of CIQ files from various administrator entities. That is, it can be desired to employ the plurality of CIQ files for generating a consolidated and updatable CIQ file for use in building a day 0/1 deployment configuration and/or for managing day 2+ configuration and continued maintenance and/or operation.

To account for one or more deficiencies of existing approaches, described herein are one or more embodiments that can employ various input information aspects to generate and/or employ a consolidated CIQ file, which consolidated CIQ file can be customizable in one or more embodiments. The various input information aspects can comprise, but are not limited to, typical CIQ input, runtime properties of a historical, preferred and/or operational telco cloud, template and/or preferred configurations, and/or a schema corresponding to vendor agnostic data modelling for different telco infrastructure configurations. As used herein, the term "vendor agnostic" refers to being non-dependent on a single product, device, vendor and/or platform. Using the various input information aspects the consolidated CIQ generation provided by the one or more embodiments can meet CSP's desired scale and/or deployment consistency requirements.

These benefits can be provided absent use of extensive manual labor, such as manually combining CIQ data, which still would result in inconsistent deployments. Rather, the one or more embodiments described herein can provide dynamic updating, at a suitable frequency, of a consolidated CIQ file. This can allow for proactive CIQ file generation prior to a request for a new deployment, in turn allowing for faster and more efficient deployments, while also providing a level of deployment consistency unable to be met by existing frameworks. In connection therewith, the one or more embodiments described herein also can provide a reduction in operating expenditures as compared to existing frameworks.

The one or more embodiments described herein can provide vendor agnostic, hardware agnostic, containers-as-a-service (CaaS) agnostic and/or workload agnostic operations. This can be facilitated by generating configuration data comprised by the CIQ data of the consolidated CIQ file that has a high granularity not dependent upon particular vendor, hardware, CaaS and/or workload.

Customization of a consolidated CIQ file can refer to an ability to meet CSP's desired scale and/or deployment consistency requirements. This can be facilitated by employing one or more template configurations during generation of the consolidated CIQ file.

In one or more embodiments, a proactive generation and updating of a consolidated CIQ file can provide additional benefits. These can include use to determine differences between deployed/not-yet-deployed telco clouds, use during backup and/or restore of telco cloud configurations, use for short-term disaster recovery by applying the last good known state of the telco cloud configuration, and/or use in auditing of changes executed on a telco cloud over a specified time period. Relative to the last option, in one or more embodiments, the dynamic updating can be performed using trackable updates to allow for determination of the consolidated CIQ from different points in time.

It is noted that any of the above benefits can be provided for a single telco cloud and/or for a cluster of one or more telco clouds. Where considering a cluster of two or more telco clouds, determinations can be based on an identified exemplary telco cloud of the cluster and/or on an aggregation of information corresponding to two or more telco clouds of the cluster.

Terminology

As used herein, the terms "cost" or "expense" can refer to power, memory and/or processing power.

As used herein, the term "data" can comprise "metadata."

Reference throughout this specification to "embodiment," "one embodiment," "an embodiment," "one implementation," and/or "an implementation," means that a feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the features, structures, or characteristics may be combined in any suitable manner in one or more embodiments/implementations.

As used herein, the terms "employing" or "employed by" can refer to an element (e.g., a hardware device) that is currently being employed, that has already been employed and/or that is to be employed.

As used herein, the term "entity" can refer to a machine, device, smart device, component, hardware, software and/or human.

As used herein, the term "group" can refer to one or more.

A "group of hardware" or "equipment" can refer to a subset of hardware devices of an operation system, which hardware devices can comprise, but are not limited to, storage nodes, switch nodes, server nodes and/or corresponding communication devices, and which operation system can comprise one or more computing systems.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "power" can refer to electrical and/or other source of power available to the operation system.

As used herein, the term "resource" can refer to power, money, memory, CPU bandwidth, processing power, labor, hardware and/or software.

As used herein, the term "set" can refer to one or more.

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 1100 illustrated at FIG. 11. In one or more described embodiments, computer and/or computing-based elements can be used in connection with implementing one or more of the systems, devices, components and/or computer-implemented operations shown and/or described in connection with FIGS. 1-9 and/or with other figures described herein.

Turning now in particular to one or more figures, and first to FIG. 1, illustrated is an architecture 100 for a control plane of a cloud computing instance 102 (e.g., telco cloud infrastructure) with which the one or more embodiments described herein can operate. That is, shown is a flow employed for managing a disaggregated telco cloud infrastructure. Generally, various layers of computing system equipment (e.g., platform layer 110, controller layer 120 and/or runtime configuration layer 130) can be employed to generate a consolidated CIQ file (CCIQ file) and a corresponding deployment plan to employ for deployment and/or modification of the cloud computing instance 102, to be discussed below in detail. The computing system equipment can be comprised by a non-limiting system 200 and/or 300 (FIGS. 2 and 3) and/or by any other computing system that is at least partially communicatively accessible to the non-limiting systems 200 and 300 (e.g., allowing for deployment configurations systems 202/302 thereof to obtain information for generating the CCIQ file).

For example, the platform layer 110 can comprise various platforms that can be employed to obtain information by the controller layer 120. For example, any one or more of a user entity hardware (hw at various figures) platform 112, vendor hardware platform 114, storage platform 116 and/or networking platform 118 can be employed by any one or more of a hardware controller 122, cloud platform controller 124, storage controller 126 and/or network controller 128. In turn, these controllers can direct one or more runtime plugins related to cloud infrastructure (e.g., infra at various figures) management and orchestration (M&O) 104. These plugins can include, but are not limited to a hardware management (mgmt at various figures) plugin 132, containers as a service (CaaS) deployer plugin 134, CaaS management plugin 135, storage O&M plugin 136 and/or network O&M plugin 138.

In one or more embodiments, the deployment configuration systems 202/302 (FIGS. 2 and 3) can obtain runtime information from these plugins of the runtime configuration layer 130. For example, CIQ files obtained from a user entity 101 can comprise file server, local to M&O and/or EPS information.

Additionally, and/or alternatively, the deployment configuration systems 202/302 can obtain information from a user entity 101 (e.g., preferences, CIQ files) and/or from an information database comprising any one or more of schema data (e.g., rules and/or thresholds for cloud computing system deployment), historical data, preference data, runtime properties, and/or the like.

These aspects of information can be leveraged to perform/execute day 0/1 operations 178-0 and 178-1 (e.g., initial deployment) and day 2-N operations 178-N (e.g., configuration changes, performance tuning, cluster scaling, etc.), such as employing automation and/or zero touch provisioning (ZTP) functionalities of cloud infrastructure M&O, whether separately from and/or employing the non-limiting systems 200 and/or 300.

Figure 2:
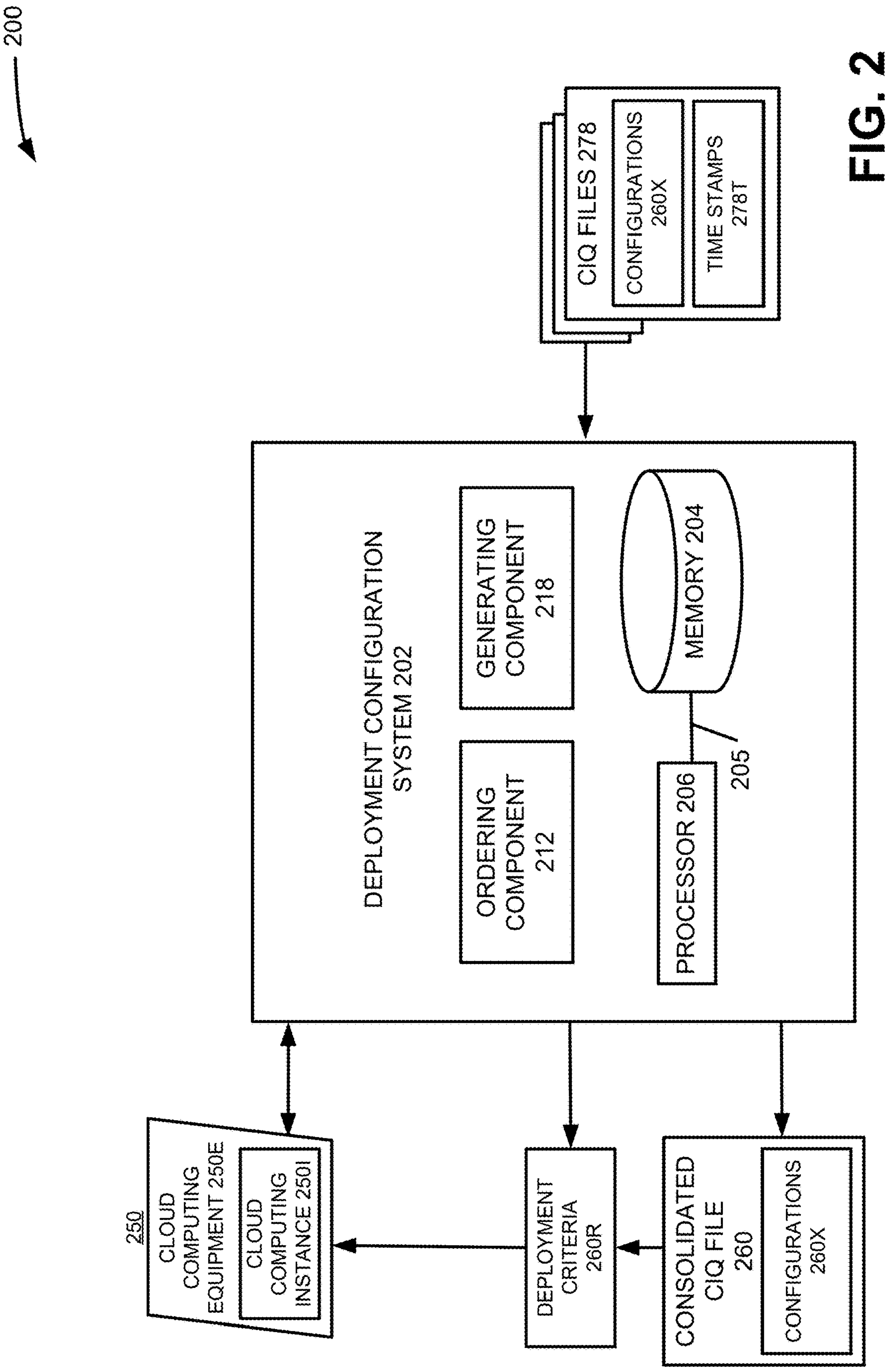
FIG. 2 illustrates a block diagram of an example, non-limiting system that can provide a process to generate and/or employ a cloud computing service deployment plan, in accordance with one or more embodiments described herein.
Figure 3:
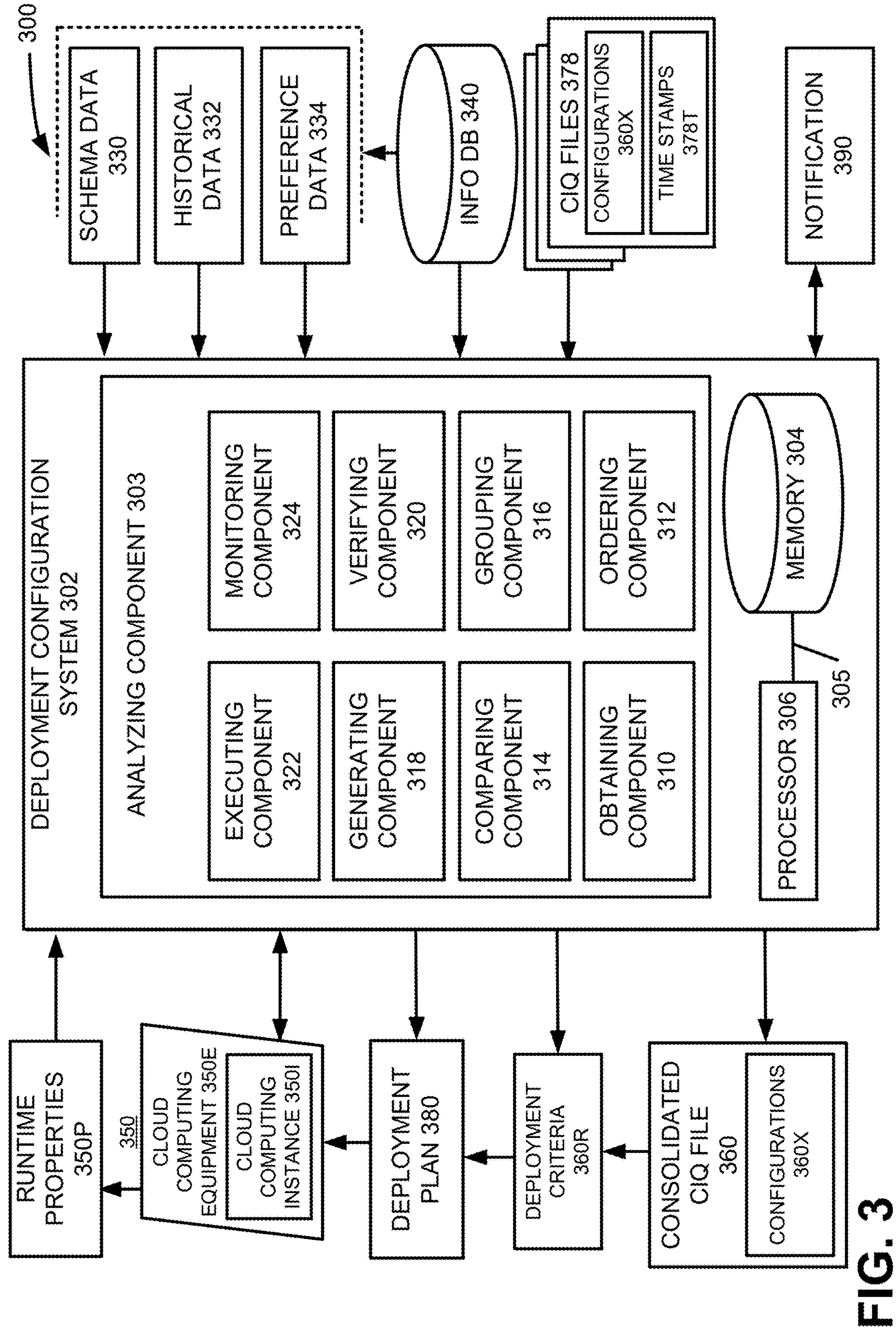
FIG. 3 illustrates a block diagram of another example, non-limiting system that can provide a process to generate and/or employ a cloud computing service deployment plan, in accordance with one or more embodiments described herein.

Turning next to FIGS. 2 and 3, illustrated are embodiments of exemplary systems for providing the generation of the aforementioned CCIQ and/or deployment plan, and/or for assisting in executing a deployment of a cloud computing system instance (e.g., a telco cloud).

FIG. 2 illustrates a block diagram of an example, non-limiting system 200 that can facilitate consistent deployment of cloud computing services 250, such as telco clouds, based on automatic consolidation and analysis of data corresponding to customer information questionnaires (e.g., CIQ files 278).

A cloud computing service 250 can comprise at least one cloud computing instance 250I (e.g., telco cloud) that can be supported by a cloud computing system 250 that can support one or more cloud computing instances. A cloud computing system 250 can comprise, and thus the corresponding cloud computing instance 250I can correspond to, computing equipment 250E, which can comprise hardware and/or software. A cloud computing system 250 can be a public and/or private cloud computing system 250.

Figure 4:
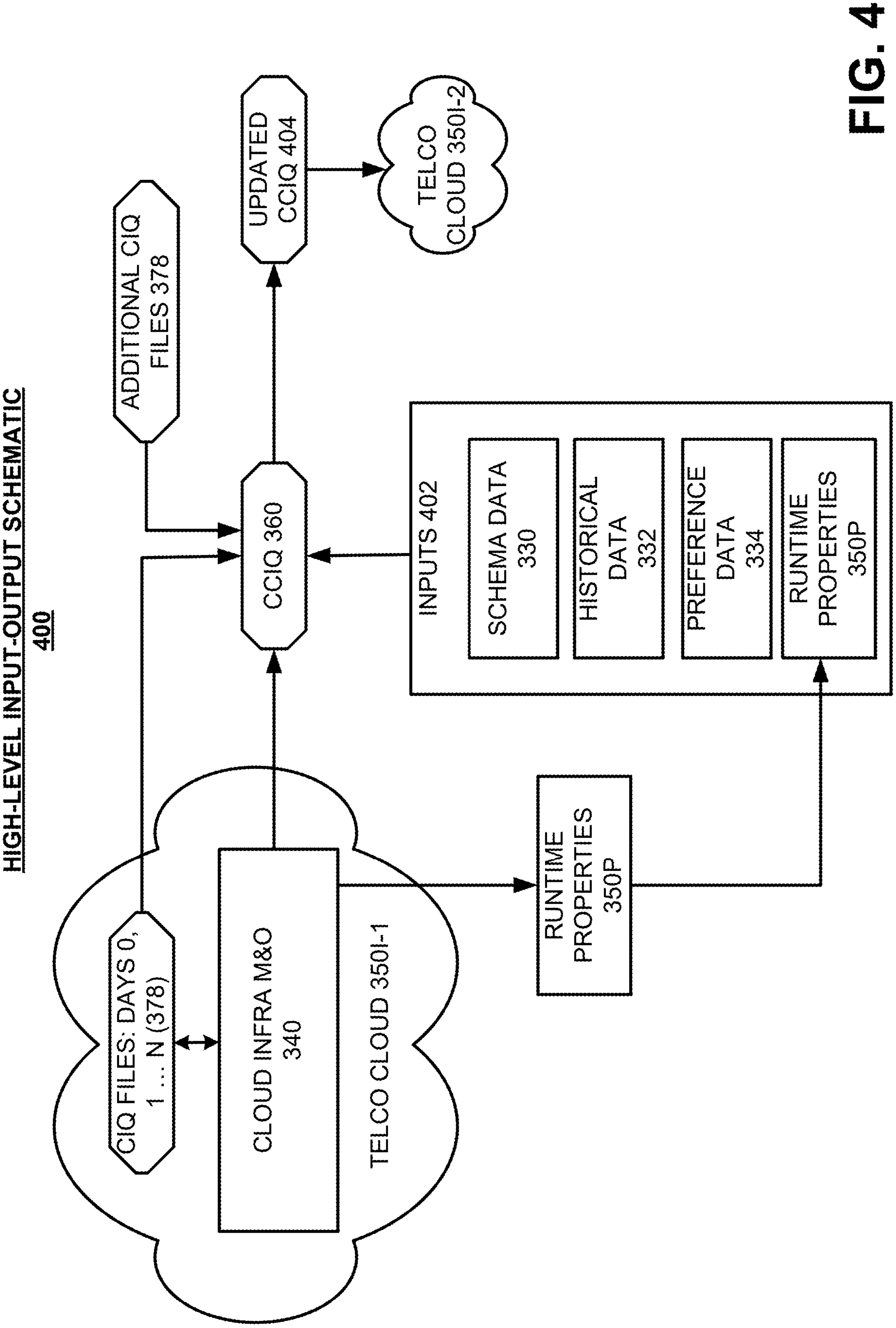
FIG. 4 illustrates a schematic diagram of a telco cloud deployment employing a deployment plan generated by the non-limiting system of FIG. 3, in accordance with one or more embodiments and/or implementations described herein.

The non-limiting system 200 can comprise a deployment configuration system 202 and the cloud computing system 250, although the cloud computing system 250 can be omitted and be external to the non-limiting system 300 in one or more embodiments. It is noted that the deployment configuration system 302 is only briefly detailed to provide but a lead-in to a more complex and/or more expansive deployment configuration system 402 as illustrated at FIG. 4. That is, further detail regarding processes performed by one or more embodiments described herein will be provided below relative to the non-limiting system 400 of FIG. 4.

Still referring to FIG. 2, the deployment configuration system 202 can comprise at least a memory 204, bus 205, processor 206 of a processor set of one or more processors, an ordering component 212 and/or a generating component 216. Using these elements, the deployment configuration system 202 can generate the CCIQ 260 to facilitate a deployment of the cloud computing instance 250I.

The ordering component 212 generally can order a set of customer information questionnaire (CIQ) files 278 according to time stamps 278T of the CIQ files 278. The CIQ files 278 can specify configurations 260X for deployment of the cloud computing instance 250I of cloud computing service 250. This can be but a first step in at least partially, and/or or fully, automatic analysis of the CIQ files 278 based on a set of schema comprising one more rules and/or thresholds. As a result, the CIQ files 278 can be aggregated, updated, duplicate configurations 260X removed, non-current configurations 260X removed, preferences employed and/or the like.

Subsequently, the generating component 216 generally can generate, based on the ordering, a the CCIQ 260 comprising a consolidated set of the configurations 260X that define deployment criteria 260R for the cloud computing service 250 (e.g., for the cloud computing instance 250I). Deployment criteria 260R can comprise specifications for deploying the cloud computing instance 250I and/or for defining function of the cloud computing instance 250I, including storage, CaaS, hardware management and/or network O&M functions.

In one or more embodiments, the ordering component 212 and/or generating component 216 can be operatively coupled to a processor 206, of a processor set of one or more processors, one or more of which are operatively coupled to a memory 204. The bus 205 can provide for the operative coupling. The processor 206 can facilitate execution of the ordering component 212 and/or generating component 216. In one or more embodiments, the ordering component 212 and/or generating component 216 can be stored at the processor 206 and/or at any processor of the processor set, together or separately from one another.

In general, the non-limiting system 200 can employ any suitable method of communication (e.g., electronic, communicative, internet, infrared, fiber, etc.) to provide communication between the deployment configuration system 202 and a cloud computing system 250.

Turning next to FIG. 3, the figure illustrates a block diagram of another example, non-limiting system 300 that can facilitate consistent deployment of cloud computing services 350, such as telco clouds, based on automatic consolidation and analysis of data corresponding to customer information questionnaires (e.g., CIQ files 378).

A cloud computing service 350 can comprise at least one cloud computing instance 350I (e.g., telco cloud) that can be supported by a cloud computing system 350 that can support one or more cloud computing instances. A cloud computing system 350 can comprise, and thus the corresponding cloud computing instance 350I can correspond to, computing equipment 350E, which can comprise hardware and/or software. A cloud computing system 350 can be a public and/or private cloud computing system 350.

FIG. 3 illustrates the non-limiting system 300 comprising a deployment configuration system 302 that can function to analyze and consolidate the CIQ files 378 into a consolidated CIQ file 360 (e.g., CCIQ 360), and further to generate and/or employ a deployment plan 380 based on the CCIQ 360. While referring here to one or more processes, operations, facilitations and/or uses of the non-limiting system 300, description provided herein, above and/or below also can be relevant to one or more other non-limiting system architectures described herein (e.g., of FIG. 2). Repetitive description of like elements and/or processes employed in respective embodiments is omitted for sake of brevity.

Generally, the deployment configuration system 302 can comprise any suitable computing devices, hardware, software, operating systems, drivers, network interfaces and/or so forth. As illustrated, the deployment configuration system 302 can comprise an obtaining component 310, ordering component 312, comparing component 314, generating component 316, verifying component 320, executing component 322 and/or monitoring component 324. These components can be comprised by a processor 304 and/or one or more of these components can be external to the processor 304. A bus 305 can operatively couple the processor 304 and a memory 306.

Communication among the components of the deployment configuration system 302 can be by any suitable method. Communication can be facilitated by wired and/or wireless methods including, but not limited to, employing a cellular network, a WAN (e.g., the Internet), and/or a LAN. Suitable wired or wireless technologies for facilitating the communications can include, without being limited to, Wi-Fi, GSM, UMTS, WiMAX, enhanced GPRS, 3GPPLTE, 3GPP2UMB, HSPA, ZIGBEE® and other 802.XX wireless technologies and/or legacy telecommunication technologies, BLUETOOTH®, SIP, RF4CE protocol, WirelessHART protocol, 6LoWPAN, Z-Wave, an ANT protocol, a UWB standard/protocol and/or other proprietary and/or non-proprietary communication protocols.

Discussion first turns to the processor 304, memory 306 and bus 305 of the deployment configuration system 302.

In one or more embodiments, the deployment configuration system 302 can comprise a processor 304 (e.g., computer processing unit, microprocessor, classical processor and/or like processor). In one or more embodiments, the processor 304 can be and/or be comprised by a controller.

In one or more embodiments, a component (which also can be referred to as a module) associated with deployment configuration system 302, as described herein with or without reference to the one or more figures of the one or more embodiments, can comprise one or more computer and/or machine readable, writable and/or executable components and/or instructions that can be executed by processor 304 to facilitate performance of one or more processes defined by such component and/or instruction.

In one or more embodiments, the deployment configuration system 302 can comprise a machine-readable memory 306 that can be operably connected to the processor 304. The memory 306 can store computer-executable instructions that, upon execution by the processor 304, can cause the processor 304 and/or one or more other components of the deployment configuration system 302 to perform one or more actions. In one or more embodiments, the memory 306 can store computer-executable components.

The deployment configuration system 302 and/or a component thereof as described herein, can be communicatively, electrically, operatively, optically and/or otherwise coupled to one another via a bus 305 to perform functions of non-limiting system architecture 300, deployment configuration system 302 and/or one or more components thereof and/or coupled therewith. Bus 305 can comprise one or more of a memory bus, memory controller, peripheral bus, external bus, local bus and/or another type of bus that can employ one or more bus architectures. One or more of these examples of bus 305 can be employed to implement one or more embodiments described herein.

In one or more embodiments, deployment configuration system 302 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the deployment configuration system 302 can reside in the cloud, and/or can reside locally in a local computing environment (e.g., at a specified location).

In addition to the processor 304 and/or memory 306 described above, the deployment configuration system 302 can comprise one or more computer and/or machine readable, writable and/or executable components and/or instructions that, when executed by processor 304, can facilitate performance of one or more operations defined by such component and/or instruction.

It is noted that in one or more embodiments, the obtaining component 310, ordering component 312, comparing component 314, generating component 316, verifying component 320, executing component 322 and/or monitoring component 324 can be implemented independently, without one or more other of the obtaining component 310, ordering component 312, comparing component 314, generating component 316, verifying component 320, executing component 322 and/or monitoring component 324. Additionally and/or alternatively, the obtaining component 310, ordering component 312, comparing component 314, generating component 316, verifying component 320, executing component 322 and/or monitoring component 324 can be comprised by a high-level analyzing component 303, one or more of the below-described functions of the obtaining component 310, ordering component 312, comparing component 314, generating component 316, verifying component 320, executing component 322 and/or monitoring component 324 can be performed by the high-level analyzing component 303, and/or the obtaining component 310, ordering component 312, comparing component 314, generating component 316, verifying component 320, executing component 322 and/or monitoring component 324 can be omitted with the high-level analyzing component 303 performing one or more of the below-described functions of the one or more omitted obtaining component 310, ordering component 312, comparing component 314, generating component 316, verifying component 320, executing component 322 and/or monitoring component 324.

Figure 5:
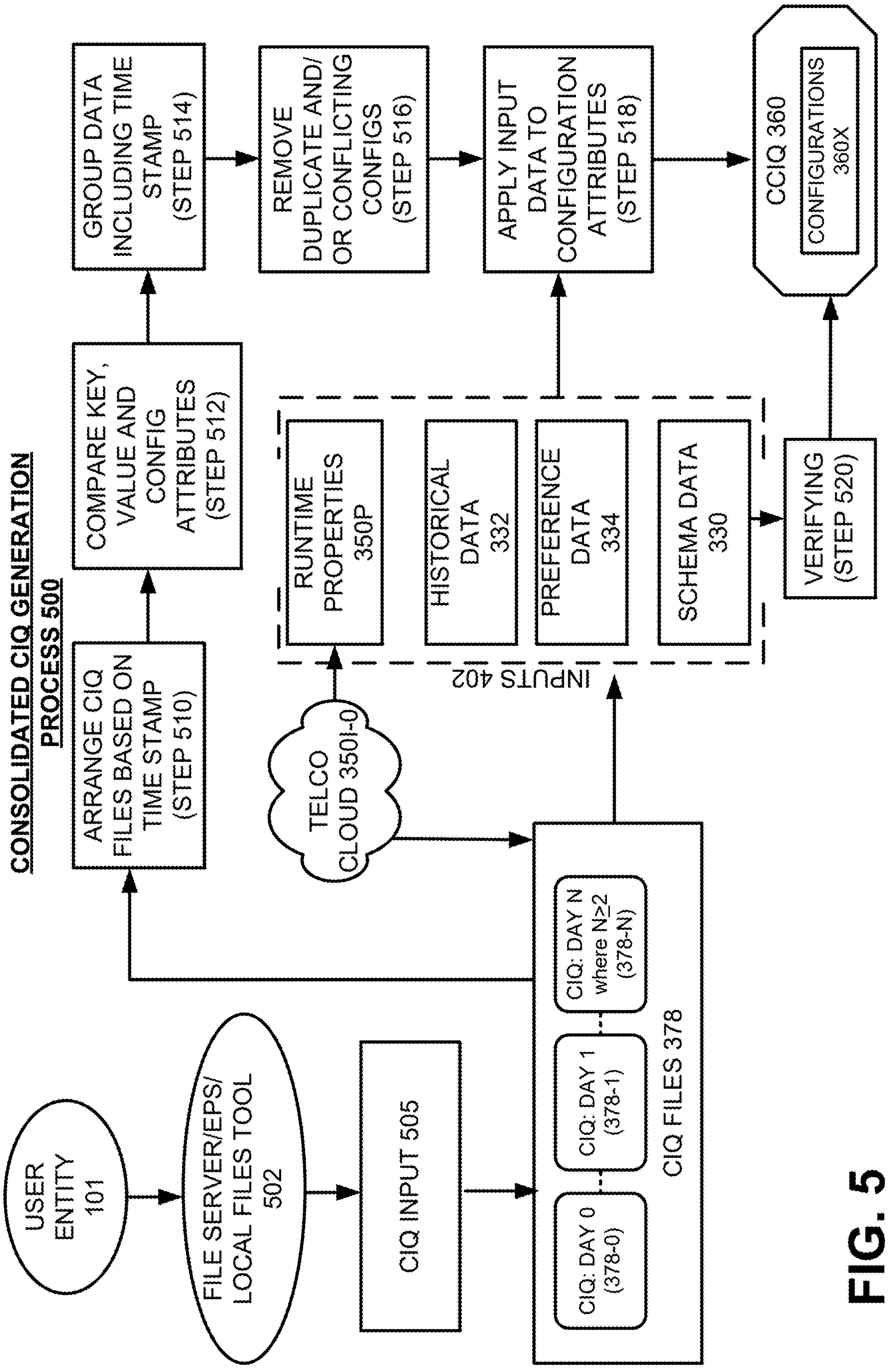
FIG. 5 provides a flow diagram illustrating a deployment plan generation by the non-limiting system of FIG. 3, in accordance with one or more embodiments and/or implementations described herein.
Figure 6:
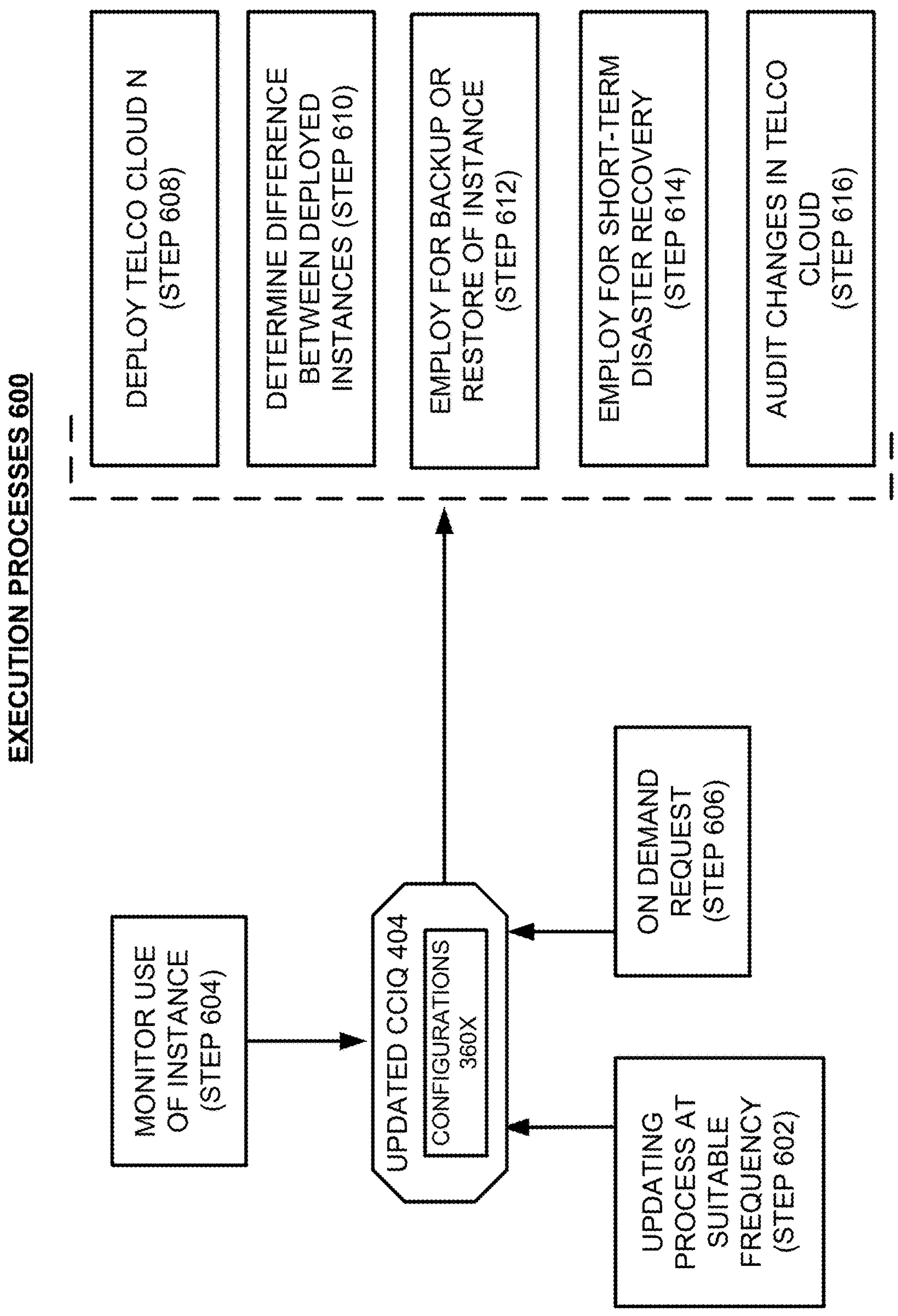
FIG. 6 illustrates a flow diagram of a deployment plan updating that can be performed by the non-limiting system of FIG. 3, in accordance with one or more embodiments and/or implementations described herein.

Direction next turns to a general, high-level set of processes 400, illustrated at FIG. 4, for deployment of a telco cloud instance or other cloud computing service instance 350, while still referring to one or more aspects of FIG. 3. FIGS. 5 and 6 will then be described with each of the components of FIG. 3 being detailed. Thereafter, flow diagrams of FIGS. 7-9 will be detailed, followed by the example operating environment and example computing environment of FIGS. 10 and 11, respectively.

Accordingly, looking now to FIG. 4, and also still continuously to FIG. 3, the high-level input-output schematic 400 is so called because the one or more embodiments described herein can generate and/or employ various inputs 402 to provide various outputs including the CCIQ 360 and deployment plan 380. In one or more embodiments, the CCIQ 360 can be employed with or without a deployment plane 380 to deploy and/or update a cloud computing service instance 350I. It will further be appreciated that the CCIQ 360 can be employed as CIQ inputs for various workflow operations from day-0 to day-N of operation of a cloud computing instance 350I.

As shown at the schematic 400, inputs 402, cloud computing instance 350I-1 and/or CIQ files 378 can be employed to generate a CCIQ, in this case, an updated CCIQ 404 based on a previous CCIQ 360. That is, the one or more embodiments described herein can be employed for deployment of a new cloud computing instance 350I, updating of an existing cloud computing instance 350I and/or deployment of a new cloud computing instance 350I based on a previous and/or existing deployment (e.g., at FIG. 4, previous telco cloud 350-I).

For example, the obtaining component 310 can receive, request, identify, determine, find and/or otherwise obtain the inputs 402, information from cloud computing instance 350I-1 and/or CIQ files 378. Any one or more of these inputs can be stored at an information database 340 (e.g., info db 340 at FIG. 3) and/or at any other suitable location communicatively accessible by the deployment configuration system 302. In one or more embodiments, the information database 340 can be internal to the deployment configuration system 302 and/or external to the non-limiting system 300.

The inputs 402 can comprise schema data 330, historical data 332, preference data 334 and/or runtime properties 350P.

The schema data 330 can comprise one or more rules and/or thresholds that can drive the consolidation of the CIQ files 378 and/or can be employed for verification of a CCIQ 360 (e.g., to verify that the CCIQ 360 generated matches the schema data 330). In one or more embodiments, the schema data 350 can comprise vendor agnostic, software agnostic and/or hardware agnostic data modelling for different configurations for different layers of any one or more cloud computing instance blocks (e.g., for any one or more telco infrastructure blocks).

The historical data 332 can comprise one or more historical results of deployment of a previous cloud computing instance 350I and/or one or more deployment criteria 360R and/or configurations 360X previously used for such previous cloud computing instance 350I.

The preference data 334 can comprise any one or more preferred configurations 360X, rules, thresholds, templates and/or the like corresponding to a user entity 101.

The runtime properties 350P can be initially originated and/or obtained from an existing cloud computing instance 350I. Runtime properties 350P can be related to any one or more of hardware management, CaaS deployment, CaaS management, storage O&M and/or network O&M, without being limited thereto. Runtime properties 350P can additionally and/or alternatively comprise baseboard management controller (BMC) configurations such as basic input/output system (BIOS), boot, storage, firmware and/or network interface card (NIC) status configurations. Runtime properties 350P can additionally and/or alternatively comprise CaaS configurations such as for any one or more of interface enumerations, operating system (OS) devices, boot devices, OS inventory, page cache, computer processing unit (CPU) affinity and/or the like. Runtime properties 350P can additionally and/or alternatively comprise workload configurations such as for any one or more of single root input/output virtualization (SR-IOV), forward error correction (FEC), pod level bonding and/or the like.

Turning now to FIG. 5, the deployment configuration system 302 can perform a consolidated CIQ generation process 500 comprising various steps 510 to 520 based on the inputs discussed above, such as, but not limited to, CIQ files 378, inputs 402, and/or information (e.g., runtime properties 350P) obtained from an already instantiated cloud computing instance (e.g., telco cloud instance 350I-0 at FIG. 5).

At step 510, looking first to the ordering component 312 of the deployment configuration system 302, this component can order a set of customer information questionnaire (CIQ) files 378 according to time stamps 378T of the CIQ files 378. The CIQ files 378 can be new CIQ files provided by a user entity 101 (e.g., CIQ input 505), historical CIQ files of historical data 332 and/or one or more CIQ files obtained by the obtaining component 310 that correspond to an already instantiated cloud computing instance (e.g., telco cloud 350I-0). CIQ input 505 can be facilitated by any one or more file server, EPS and/or local file tools for obtaining the data/metadata comprised by the CIQ files 378 from the one or more user entities 101. The CIQ files 378 can specify configurations 360X for deployment and/or operation of a cloud computing instance 350I. The time stamps 378T can be provided in any suitable format, whether in log, data and/or metadata, and/or provided with and/or separate from the CIQ files 378.

With regards to the CIQ input 505, the user entity 101 can provide different CIQ input, e.g., CIQ files 378, at different times related to the cloud computing instance 350I. That is, as illustrated, the CIQ files 378 can comprise those for various times of input/operation at a cloud computing instance 350I (e.g., 378-0, 378-1 and/or 378-N). While the term "day" is used herein and at the various figures, any other increment of time can be employed. Accordingly, ordering can be ascending in time, descending in time, or any other suitable ordering.

In one example, non-day-0 CIQ data can comprise one or more configurations 360X related to one or more workflows (e.g., related to boot device, object-based storage device mapping, IP assignment, etc.).

At step 512, the comparing component 314 can comparing different types of the configurations 360X of the CIQ files 378 to one another and/or to historical types of historical configurations and historical deployment results (e.g., historical data 332) that are based on the historical configurations. Compared can be any one or more key, value and/or attribute configurations. The types can comprise storage-related, network-related, CaaS-related, hardware-related, firmware-related, software-related, work flow-related, etc. The comparing can result in data/metadata to be employed for grouping of the CIQ files 378, which data/metadata can comprise one or more markers, pointers, labels, etc.

At step 514, the grouping component 316 can grouping the CIQ files 378 according to the configurations 360X specified by the CIQ files 360X. That is, the grouping component 316 can group the files by type of configuration, by category of configuration (key, value, attribute) and/or by any other grouping. This grouping can aid the grouping component 316 in one or more filtering processes for determining one or more duplicates and/or conflicting configurations 360X comprised by the plurality of CIQ files 378. It is noted that these comparisons can be made as one-to-one, one-to-many, many-to-many and/or many-to-one.

For example, at step 516, the grouping component 316 can generally remove duplicate and/or conflicting configurations **360*x* based on the data comprised by the configurations 360X and/or based on one or more of the time stamps 378T associated with the one or more configurations 360X. In one or more cases, conflicting configurations 360X can be filtered with preference to the configuration having a most-recent time stamp 378T**.

The filtering processes can comprise, but are not limited to, determining that a first CIQ file 378 of the CIQ files 378 and a second CIQ file 378 of the CIQ files 378 are duplicate CIQ files 378; and/or resolving the duplicate CIQ files 378 by including the first CIQ file 378 having a more recent time stamp 378T and excluding the second CIQ file 378. Additionally, and/or alternatively, this can comprise determining that a first time stamp 378T corresponding to the first CIQ file 378 is a more recent time stamp 378T than a second time stamp 378T corresponding to the second CIQ file 378; and/or resolving the CIQ files 278 by excluding, from the generating of the consolidated CIQ file 360, a configuration 360X of the second CIQ file 378 where a first time stamp 378T corresponding to the first CIQ file 378 is a more recent time stamp 378T than a second time stamp 378T corresponding to the second CIQ file 378. It is noted that these determinations need not be one-to-one as provided above in the examples, but rather can be one-to-many, many-to-many and/or many-to-one.

In one or more embodiments, one or more filtering applications can additionally and/or alternatively be performed by the grouping component 316 to filter out one or more configurations 360X that do not pertain to a set of specified configuration types (e.g., network, CaaS, hardware, firmware, software, storage) and/or configuration categories (e.g., key, value, attribute). It is noted that these lists of types and categories are not meant to be exhaustive.

Based on the resulting set of configurations 360X remaining after the filtering conducted by the grouping component 316, the generating component 318 can generate the consolidated set of the configurations 360X. That is, the generating component 318 can output the remaining set of configurations 360X (e.g., those non-filtered out) in any suitable format. In one or more embodiments, the set of configurations 360X can be re-ordered by time stamp 278T, e.g., by assistance from the ordering component 312. In one or more embodiments, as noted above, the generating components 318 can perform this action according to a format applicable to multiple hardware types and/or usable by different cloud computing equipment 350E associated with different cloud computing service providers.

At step 518, the generating component 318 can apply the runtime properties 350P to the configuration of the CIQ files, resulting in the consolidated set of the configurations 360X. As illustrated at FIG. 5 and noted above, these runtime properties 350P can be obtained based on the CIQ files 378 and/or from a previously-instantiated cloud computing instance 350I.

Based thereon, the generating component 318 can generate a consolidated CIQ file 360 that comprises a consolidated set of the configurations 360X defining deployment criteria 360R for the cloud computing service 350I to be deployed.

In one or more embodiments, the consolidated set of the configurations 360X can be provided by the generating component 318 along with a template generated by the generating component 318, which template (e.g., deployment plan 380) can provide a structure for use by one or more downstream processes. This template can be based on the application of the run time properties 350P on the CCIQ 360, such as where the generating component 318 can employ one or more schema definitions (e.g., schema data 330) to guide the generation of the template.

At step 520, the verifying component 320 can verify that the consolidated CIQ file 360 satisfies a specified schema data 330 comprising at least one rule to be satisfied by the consolidated CIQ file 360 and/or at least one key performance indicator threshold to be satisfied by the consolidated CIQ file 360. For example, the rules and/or thresholds can be related to any one or more of data type, minimum and/or maximum length, possible and/or allowed values, conversions of one or more specific values based on generic compute/storage configurations, cross validation of the CIQ files to specific workflow, node identity, etc.

It will be appreciated that in one or more embodiments, any one or more inputs 402 can be employed at a different one or more steps as particularly illustrated at FIG. 5. For example, inputs 402 can be employed for step 510.

Turning briefly back to FIG. 4, in one or more uses of the deployment configuration system 302, the deployment configuration system 302 can be employed to update a CCIQ 360 to allow for deployment of a secondary cloud computing instance 350I (e.g., 350I-2) related to a previously instantiated cloud computing instance 350I (e.g., 350I-1).

For example, telco cloud 1, corresponding to a first user entity, can be fully operational after a series of one or more operations executed between a corresponding day-0/1 to day-N. For example, such steps can be taken by the user entity 101 to deploy telco cloud 1. Telco cloud 1 can have the following updates related thereto based on one or more CIQ files 378 employed by the deployment configuration system 302 and/or other system relative to the already instantiated telco cloud 1:

- CIQ: Day 0/1—Admin/User deploys telco cloud 1 using automation/ZTP;
- CIQ 1: Day 2—Admin/User perform storage configuration;
- CIQ 2: Day 10—Admin/User makes changes to precision time protocol (PTP) configuration; and
- CIQ N: Day N—Admin/User adds a worker node to an existing cluster.

Further, the entity 101 can desire to deploy another telco cloud (e.g., telco cloud 2) which is identical to telco cloud 1 by leveraging these same CIQ files (e.g., CIQ, CIQ 1, CIQ 2, CIQ N) used for the deployment of telco cloud 1. Accordingly, the deployment configuration system 302 can update the CCIQ 360, resulting in the updated CCIQ 404 and corresponding deployment plan 380 to be employed to deploy the telco cloud 2.

Turning now to FIG. 6, and still to continuously to FIG. 3, the deployment configuration system 302 can additionally and/or alternatively assist with one or more post-deployment processes, operations and/or activities.

The post-deployment aspects can comprise, but are not limited to, monitoring use of a cloud computing instance 350I (step 604) by the monitoring component 224; responding by the generating component 318 to an on demand request (step 606) for a generation of a CCIQ 360 and/or updated CCIQ 404; deploying another telco cloud N, e.g., via facilitation of the executing component 322 (step 608); determining a difference between deployed cloud computing instances 350I by the executing component 322 (step 610); employing, by the executing component 322, the CCIQ 360/404 for backup and/or restoration of a cloud computing instance (step 612); employing, by the executing component 322, the CCIQ 360/404 for a short-term disaster recovery operation (step 614); and/or employing, by the executing component 322, the CCIQ 360/404 for an audit of one or more changes of an instantiated cloud computing instance 350I. As illustrated, steps 608-616 can be related and/or completely unrelated to one another.

For example, in one or more embodiments, the monitoring component 224 can read metadata associated with the consolidated CIQ file 360, identify a deficiency of a computing operation when accessing the deployed cloud computing service 350I, request adjustment of the consolidated set of the configurations of the consolidated CIQ file based on the deficiency (e.g., by generating a notification 390), thereby mitigating or eliminating the deficiency when a next cloud computing service 350I (e.g., 350I-2 at FIG. 4) is deployed according to the consolidated CIQ file (e.g., updated CCIQ file 404).

Example Operations

Figure 7:
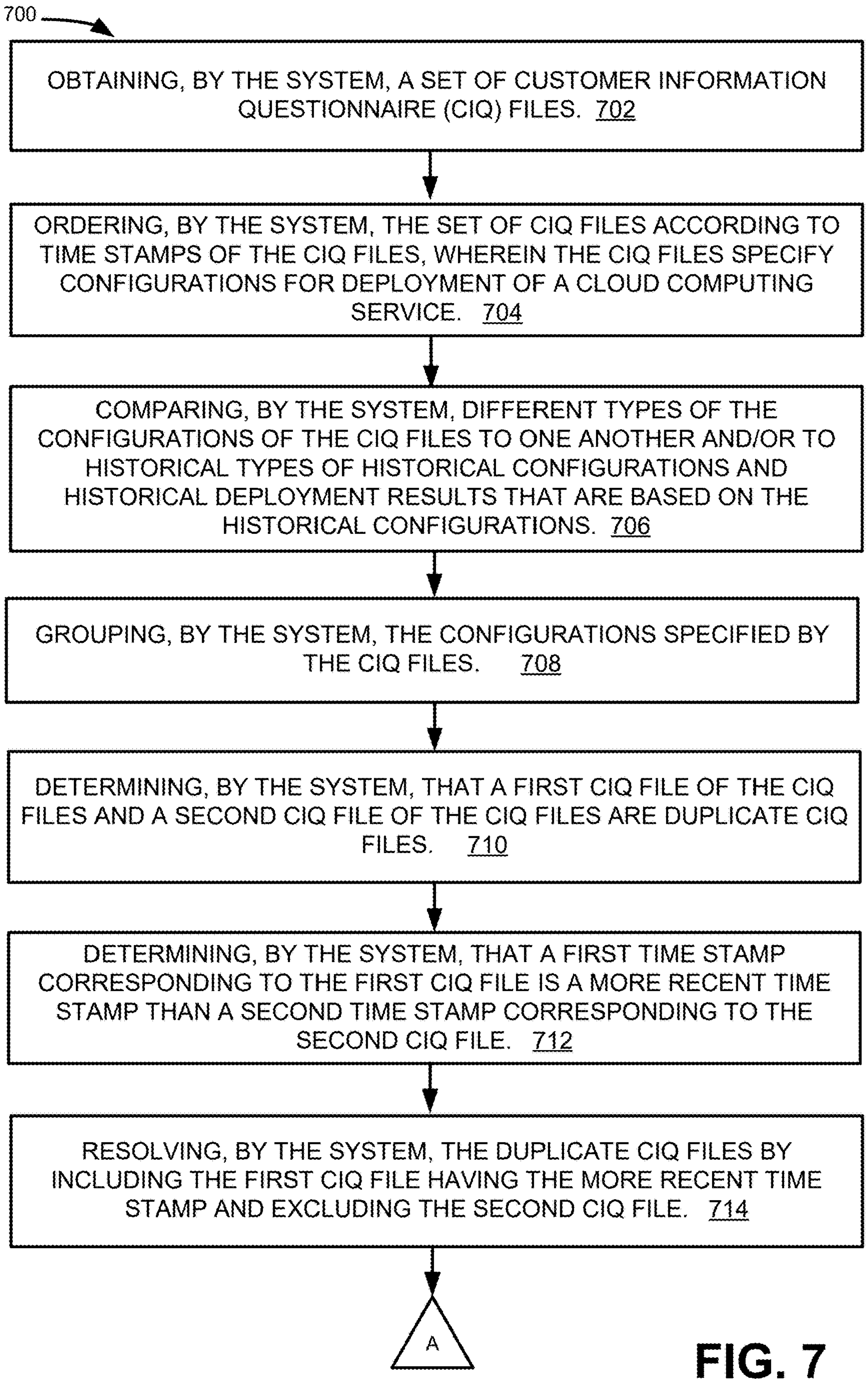
FIG. 7 illustrates a process flow diagram of a method of generating a deployment plan for, and deploying, a cloud computing service deployment, in accordance with one or more embodiments and/or implementations described herein.
Figure 8:
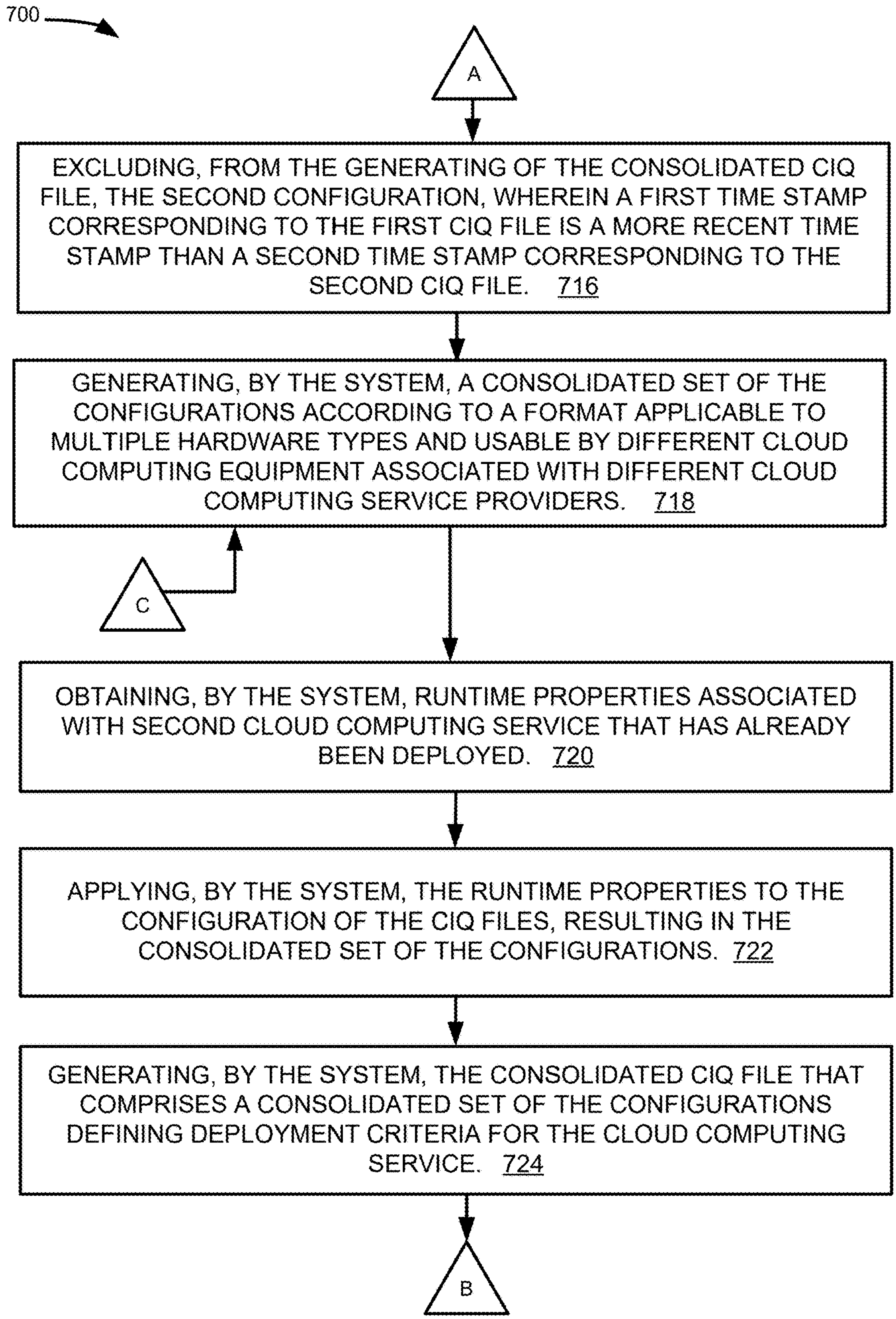
FIG. 8 illustrates a continuation of the process flow diagram of FIG. 7 of the method of generating a deployment plan for, and deploying, a cloud computing service deployment, in accordance with one or more embodiments and/or implementations described herein.
Figure 9:
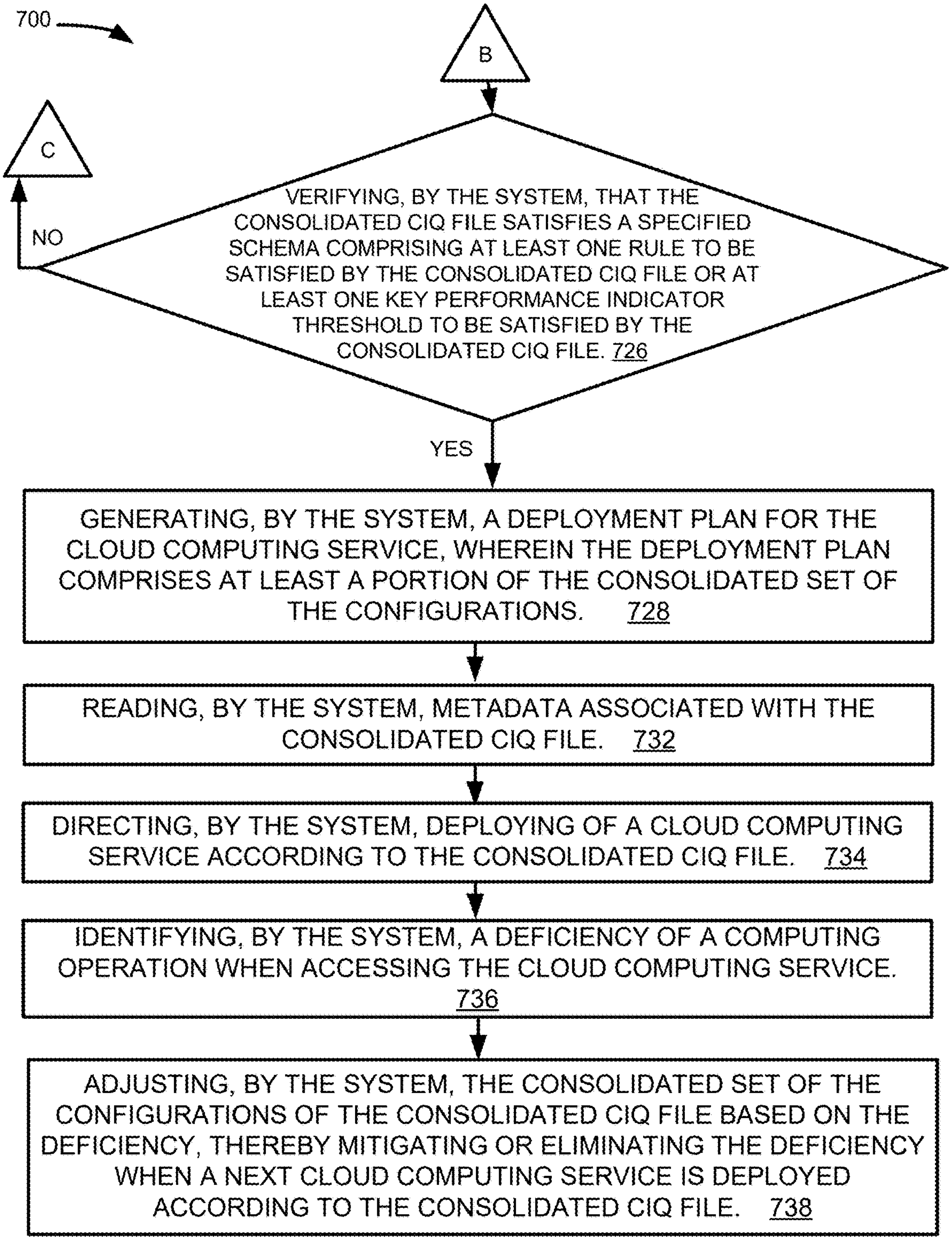
FIG. 9 illustrates a continuation of the process flow diagram of FIG. 8 of the method of generating a deployment plan for, and deploying, a cloud computing service deployment, in accordance with one or more embodiments and/or implementations described herein.

As a first summary of the above description relative to FIGS. 1-6, turning now to FIGS. 7 to 9, a process flow comprising a set of operations for consolidated CIQ-based deployment plan generation for cloud computing is set forth. One or more elements, objects and/or components referenced in the process flow 700 can be those of schematics 100-600. Repetitive description of like elements and/or processes employed in previously described embodiments is omitted for sake of brevity.

At operation 702, the process flow 700 can comprise obtaining, by the system (e.g., obtaining component 310), a set of customer information questionnaire (CIQ) files (e.g., CIQ files 378).

At operation 704, the process flow 700 can comprise ordering, by the system (e.g., ordering component 312) the set of CIQ files according to time stamps (e.g., time stamps 378T) of the CIQ files, wherein the CIQ files specify configurations (e.g., configurations 360X) for deployment of a cloud computing service (e.g., cloud computing service 350).

At operation 706, the process flow 700 can comprise comparing, by the system (e.g., comparing component 314), different types of the configurations of the CIQ files to one another and/or to historical types of historical configurations and historical deployment results that are based on the historical configurations (e.g., historical data 332).

At operation 708, the process flow 700 can comprise grouping, by the system (e.g., grouping component 316), the configurations specified by the CIQ files.

At operation 710, the grouping of the process flow 700 can comprise determining, by the system (e.g., grouping component 316), that a first CIQ file of the CIQ files and a second CIQ file of the CIQ files are duplicate CIQ files.

At operation 712, the grouping of the process flow 700 can comprise determining, by the system (e.g., grouping component 316), that a first time stamp corresponding to the first CIQ file is a more recent time stamp than a second time stamp corresponding to the second CIQ file.

At operation 714, the grouping of the process flow 700 can comprise resolving, by the system (e.g., grouping component 316), the duplicate CIQ files by including the first CIQ file having the more recent time stamp and excluding the second CIQ file.

At operation 716, the grouping of the process flow 700 can comprise excluding, by the system (e.g., grouping component 316), from a generating of a consolidated CIQ file, the second configuration, wherein a first time stamp corresponding to the first CIQ file is a more recent time stamp than a second time stamp corresponding to the second CIQ file.

At operation 718, the process flow 700 can comprise, generating, by the system (e.g., generating component 318), a consolidated set of the configurations according to a format applicable to multiple hardware types and usable by different cloud computing equipment (e.g., cloud computing equipment 350E) associated with different cloud computing service providers.

At operation 720, the process flow 700 can comprise obtaining, by the system (e.g., obtaining component 310), runtime properties (e.g., runtime properties 336) associated with second cloud computing service that has already been deployed.

At operation 722, the process flow 700 can comprise applying, by the system (e.g., generating component 318), the runtime properties to the configuration of the CIQ files, resulting in the consolidated set of the configurations.

At operation 724, the process flow 700 can comprise generating, by the system (e.g., generating component 318), the consolidated CIQ file (e.g., consolidated CIQ file 360) that comprises a consolidated set of the configurations defining deployment criteria (e.g., deployment criteria 360R) for the cloud computing service.

At operation 726, the process flow 700 can comprise verifying, by the system (e.g., verifying component 320), that the consolidated CIQ file satisfies a specified schema comprising at least one rule to be satisfied by the consolidated CIQ file or at least one key performance indicator threshold to be satisfied by the consolidated CIQ file (e.g., verifying 520). If yes, proceed to step 728. If not, go back to step 718 to regenerate the consolidated set of the configurations.

At operation 728, the process flow 700 can comprise generating, by the system (e.g., generating component 318), a deployment plan (e.g., deployment plan 380) for the cloud computing service, wherein the deployment plan comprises at least a portion of the consolidated set of the configurations.

At operation 730, the process flow 700 can comprise reading, by the system (e.g., executing component 322), metadata associated with the consolidated CIQ file.

At operation 732, the process flow 700 can comprise directing, by the system (e.g., executing component 322), deploying of a cloud computing service according to the consolidated CIQ file.

At operation 734, the process flow 700 can comprise identifying, by the system (e.g., monitoring component 324), a deficiency of a computing operation when accessing the cloud computing service.

At operation 736, the process flow 700 can comprise adjusting, by the system (e.g., monitoring component 324 directing the generating component 318), the consolidated set of the configurations of the consolidated CIQ file based on the deficiency, thereby mitigating or eliminating the deficiency when a next cloud computing service is deployed according to the consolidated CIQ file.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the figures provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, described is technology that facilitates consistent deployment of cloud computing services, such as telco clouds, based on automatic consolidation and analysis of data corresponding to customer information questionnaires. An associated method comprises ordering a set of customer information questionnaire (CIQ) files according to time stamps of the CIQ files, wherein the CIQ files specify configurations for deployment of a cloud computing service, and based on the ordering, generating a consolidated CIQ file that comprises a consolidated set of the configurations defining deployment criteria for the cloud computing service.

An example benefit of one or more of the above-indicated method, system and/or non-transitory computer-readable medium can be an ability to provide a hardware, software and/or vendor agnostic deployment plan able to be employed generally absent being dependent on a single product, service, device, vendor and/or platform. In this way, it can be easier for a CSP to meet desired scale and/or deployment consistency requirements.

The dynamic updating ability of the one or more embodiments described herein can be provided by automatically generating and/or obtaining a notification of a change of an operating parameter of cloud networking equipment being employed or of a change to a key performance indicator being monitored either on the provider-end (e.g., provider of the cloud networking system) and/or at the user-end (e.g., user entity of the cloud networking system). The dynamic updating ability additionally and/or alternatively can be provided by automatically identifying and/or responding to a new CIQ file corresponding to the cloud computing service, Another example benefit of one or more of the above-indicated method, system and/or non-transitory computer-readable medium can be an ability to provide a proactive generation and updating of a consolidated CIQ file. This can be used to determine differences between deployed/not-yet-deployed telco clouds, during backup and/or restore of telco cloud configurations, for short-term disaster recovery by applying the last good known state of the telco cloud configuration, and/or in auditing of changes executed on a telco cloud over a specified time period. Relative to the last option, in one or more embodiments, the dynamic updating can be performed using trackable updates to allow for determination of the consolidated CIQ from different points in time.

Furthermore, any of the above benefits can be provided for a single telco cloud and/or for a cluster of one or more telco clouds. Where considering a cluster of telco clouds, determinations can be based on an identified exemplary telco cloud of the cluster and/or on an aggregation of information corresponding to two or more telco clouds of the cluster.

Indeed, in view of the one or more embodiments described herein, a practical application of the above-indicated method, system and/or non-transitory computer-readable medium can be an ability to generate and/or update a consolidated CIQ file comprising a consolidation, and not just a mere merging, of two or more CIQ files. That is, the generation can comprise, but is not limited to, determination of time stamps, duplicates, preferences, etc. that can affect a rules-based generation of the consolidated CIQ file. As a result, cloud computing instance deployments can be consistent with one another and/or consistent with one or more existing cloud computing instances, including where an existing cloud computing instance has been updated post-deployment.

These are useful and practical applications of computers, thus providing enhanced (e.g., improved and/or optimized) operation of the hardware and/or software components for use with a cloud computing system. Indeed, a deployment plan can affect use and/or architecture at the user entity-side, thus allowing for such use and/or architecture to be self-improving relative to continuous updating of a deployment plan, and/or relative to generation of a new deployment plan, as discussed herein. That is, by proactively gathering and/or analyzing information for defining one or more deployment criteria affecting deployment configurations, a new cloud computing instance deployment (e.g., of a telco cloud) can be consistent with existing cloud computing system instances at day 0 operations, even based on day 2+ runtime properties of the existing cloud computing system instances. Overall, such tools can constitute a concrete and tangible technical and/or physical improvement in the fields of cloud computing and/or deployment of cloud computing instances.

Furthermore, one or more embodiments described herein can be employed in a real-world system based on the disclosed teachings. For example, one or more embodiments described herein can function with a computer system and/or one or more servers for internet, cloud and/or internal/external networks to perform the aforementioned CIQ consolidation and/or generation processes.

Further, one or more embodiments described herein are inherently and/or inextricably tied to computer technology and cannot be implemented outside of a computing environment. For example, one or more processes performed by one or more embodiments described herein can more efficiently, and even more feasibly, deploy a cloud computing instance that is consistent with one or more existing cloud computing instances as compared to existing systems and/or techniques. Systems, computer-implemented methods and/or computer program products facilitating performance of these processes are of great utility in the fields of cloud computing and/or deployment of cloud computing instances and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively operate processes that perform runtime properties discovery, deployment configuration consolidation and/or consolidation of CIQ files as the one or more embodiments described herein can facilitate these processes. And, neither can the human mind nor a human with pen and paper automatically perform one or more of the processes as conducted by one or more embodiments described herein.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not described herein for the sake of brevity, but known by those of skill in the art.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud operation systems, computer architecture and/or another technology.

One or more embodiments described herein can be fully operational towards performing one or more other functions (e.g., fully powered on, fully executed and/or another function) while also performing the one or more operations described herein.

The paragraphs that follow provide additional summary reciting a system, a method and a computer-readable medium.

A system, comprising: at least one processor; and at least one memory that stores executable instructions that, when executed by the at least one processor, facilitate performance of operations, comprising: ordering a set of customer information questionnaire (CIQ) files according to time stamps of the CIQ files, wherein the CIQ files specify configurations for deployment of a cloud computing service; and based on the ordering, generating a consolidated CIQ file that comprises a consolidated set of the configurations defining deployment criteria for the cloud computing service.

The system of the preceding paragraph, wherein the operations further comprise: reading metadata associated with the consolidated CIQ file; and via cloud computing equipment, deploying a cloud computing service according to the consolidated CIQ file.

The system of any preceding paragraph, wherein the generating comprises: generating the consolidated set of the configurations according to a format applicable to multiple hardware types and usable by different cloud computing equipment associated with different cloud computing service providers.

The system of any preceding paragraph, wherein the operations further comprise: comparing different types of the configurations of the CIQ files to one another; and generating the consolidated set of the configurations based on a result of the comparing.

The system of any preceding paragraph, wherein the operations further comprise: comparing different types of the configurations of the CIQ files to historical types of historical configurations and historical deployment results that are based on the historical configurations; and generating the consolidated set of the configurations based on a result of the comparing.

The system of any preceding paragraph, wherein the operations further comprise: subsequent to the ordering, grouping the CIQ files according to the configurations specified by the CIQ files, the grouping comprising: determining that a first CIQ file of the CIQ files and a second CIQ file of the CIQ files are duplicate CIQ files, determining that a first time stamp corresponding to the first CIQ file is a more recent time stamp than a second time stamp corresponding to the second CIQ file, and as part of the grouping, resolving the duplicate CIQ files by including the first CIQ file having the more recent time stamp and excluding the second CIQ file.

The system of any preceding paragraph, wherein the operations further comprise: resolving an instance of conflict between a first configuration specified by a first CIQ file, of the CIQ files, that conflicts with a second configuration specified by a second CIQ file, of the CIQ files, wherein a first time stamp corresponding to the first CIQ file is a more recent time stamp than a second time stamp corresponding to the second CIQ file, and wherein the resolving comprises excluding, from the generating of the consolidated CIQ file, the second configuration.

The system of any preceding paragraph, wherein the operations further comprise: obtaining runtime properties associated with second cloud computing service that has already been deployed; and as part of the generating, applying the runtime properties to the configuration of the CIQ files, resulting in the consolidated set of the configurations.

The system of any preceding paragraph, wherein the operations further comprise: based on the consolidated set of the configurations, generating a deployment plan for the cloud computing service, wherein the deployment plan comprises at least a portion of the consolidated set of the configurations.

The system of any preceding paragraph, wherein the operations further comprise: verifying that the consolidated CIQ file satisfies a specified schema comprising at least one rule to be satisfied by the consolidated CIQ file or at least one key performance indicator threshold to be satisfied by the consolidated CIQ file.

The system of any preceding paragraph, wherein the operations further comprise: identifying a deficiency of a computing operation when accessing the cloud computing service; and in response to the identifying, adjusting the consolidated set of the configurations of the consolidated CIQ file based on the deficiency, thereby mitigating or eliminating the deficiency when a next cloud computing service is deployed according to the consolidated CIQ file.

A method, comprising: based on an analysis of customer information questionnaire (CIQ) files, determining, by a system operatively coupled to at least one processor, configurations usable to deploy a cloud computing service, wherein the configurations comprise runtime attributes; and based on the configurations, generating a consolidated CIQ file that comprises a consolidated group of the configurations defining deployment criteria for the cloud computing service.

The method of the preceding paragraph, further comprising: prior to the generating of the consolidated CIQ file, ordering the CIQ files according to time stamps represented by metadata associated with the CIQ files.

The method of any preceding paragraph, wherein respective metadata associated with the CIQ files comprises information specifying respective drafters of the CIQ files.

The method of any preceding paragraph, further comprising: resolving an instance of conflict between a first configuration specified by a first CIQ file, of the CIQ files, that conflicts with a second configuration specified by a second CIQ file, of the CIQ files, by employing, as part of the generating, only the CIQ file, of the first CIQ file and the second CIQ file, having a more recent time stamp.

The method of any preceding paragraph, wherein the generating comprises: generating the consolidated group of the configurations in accordance with a format applicable to a plurality of hardware types and a plurality of cloud computing service providers.

A non-transitory machine-readable medium, comprising executable instructions that, when executed by at least one processor facilitate performance of operations, comprising: identifying a failure associated with a computing operation of a cloud computing service when accessing the cloud computing service; and adjusting a consolidated CIQ file based on the failure, thereby overcoming the failure when the cloud computing service is re-deployed according to the consolidated CIQ file, wherein the consolidated CIQ file comprises configurations merged from at least two CIQ files, and wherein the configurations specify deployment criteria usable when deploying the cloud computing service.

The non-transitory machine-readable medium of the preceding paragraph, wherein the operations further comprise: at a specified frequency, merging a group of CIQ files, the merging comprising ordering the group of CIQ files according to respective time stamps of the group of CIQ files, the merging resulting in a merged CIQ file; and performing the adjusting of the consolidated CIQ file at least partially based on the merged CIQ file.

The non-transitory machine-readable medium of any preceding paragraph, wherein the adjusting of the consolidated CIQ file results in an adjusted version of the consolidated CIQ file, and wherein the operations further comprise: deploying another cloud computing service, other than the cloud computing service, based on the adjusted version of the consolidated CIQ file.

The non-transitory machine-readable medium of any preceding paragraph, wherein the operations further comprise: triggering an updating of the consolidated CIQ file based on obtaining a notification that a scale of use of the cloud computing service has changed.

Example Operating Environment

Figure 10:
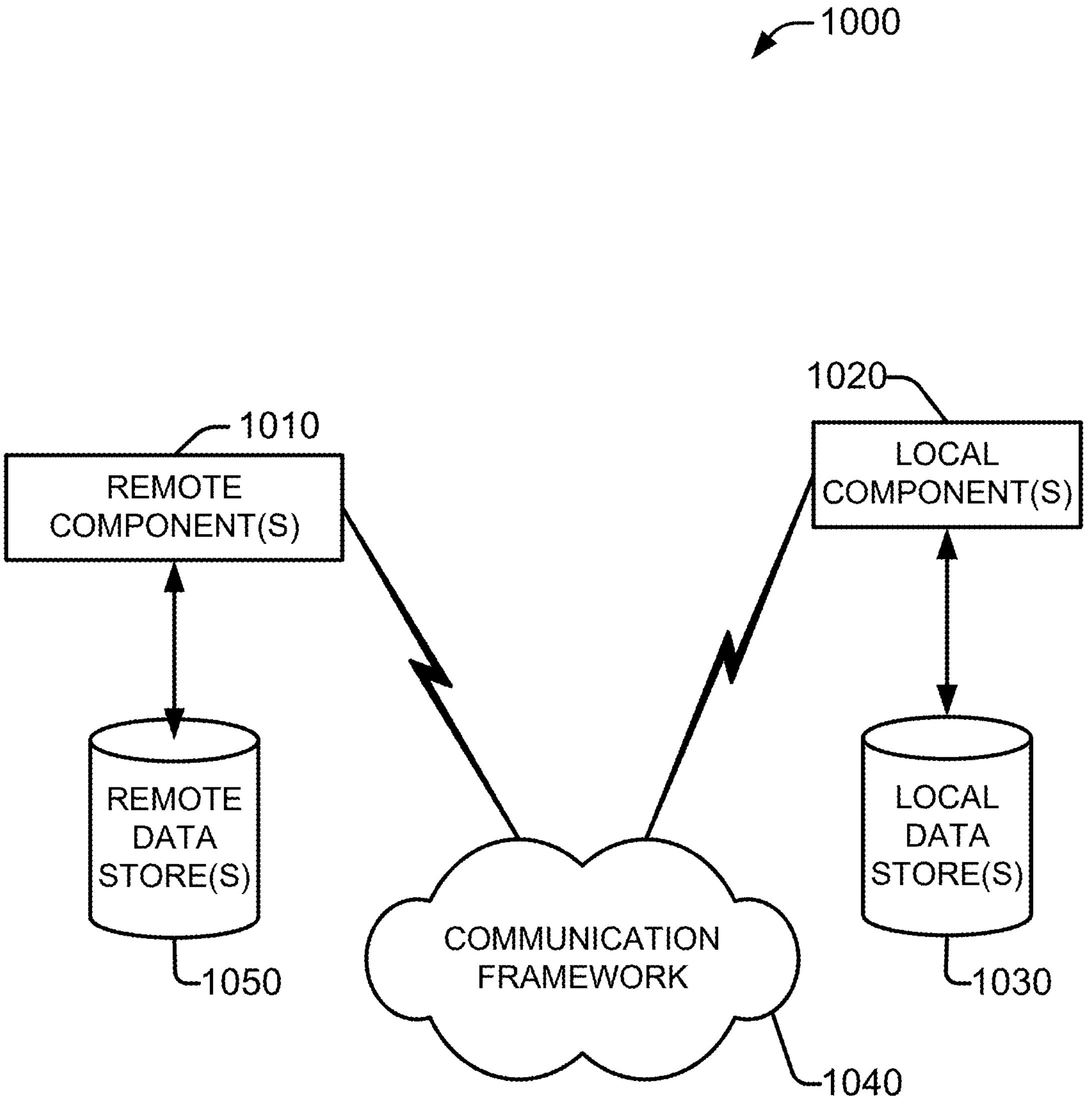
FIG. 10 illustrates a block diagram of an example operating environment into which embodiments of the subject matter described herein can be incorporated.

FIG. 10 is a schematic block diagram of an operating environment 1000 with which the described subject matter can interact. The operating environment 1000 comprises one or more remote component(s) 1010. The remote component(s) 1010 can be hardware and/or software (e.g., threads, processes, computing devices). In one or more embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The operating environment 1000 also comprises one or more local component(s) 1020. The local component(s) 1020 can be hardware and/or software (e.g., threads, processes, computing devices). In one or more embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The operating environment 1000 comprises a communication framework 1040 that can be employed to facilitate communications between the remote component(s) 1010 and the local component(s) 1020, and can comprise an air interface, e.g., interface of a UMTS network, via an LTE network, etc. Remote component(s) 1010 can be operably connected to one or more remote data store(s) 1050, such as a hard drive, solid state drive, subscriber identity module (SIM) card, electronic SIM (eSIM), device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Example Computing Environment

In order to provide additional context for various embodiments described herein, FIG. 16 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 11:
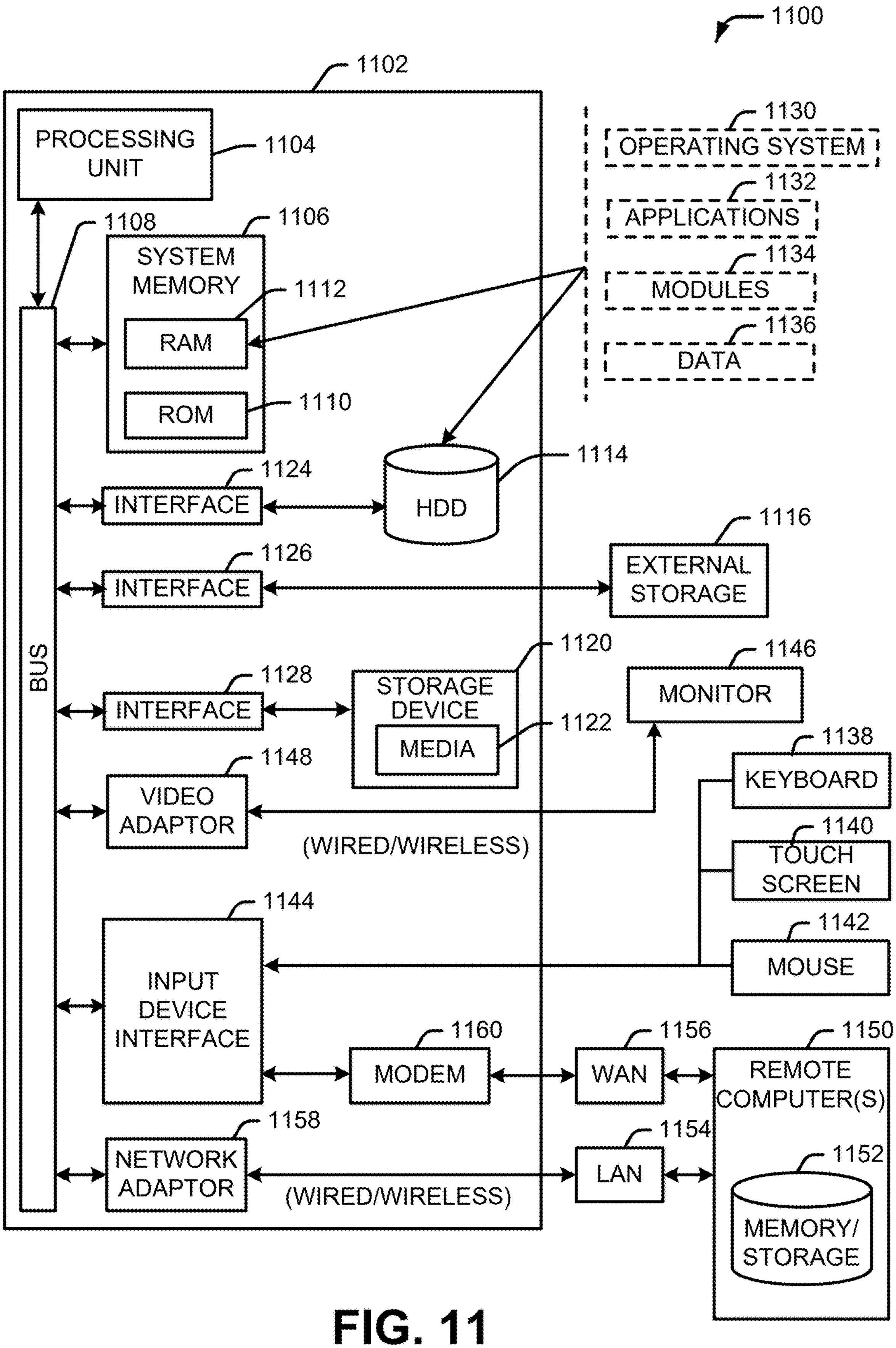
FIG. 11 illustrates an example schematic block diagram of a computing environment with which the subject matter described herein can interact and/or be implemented at least in part.

Referring still to FIG. 11, the example computing environment 1100 which can implement one or more embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in computing environment 1100, a solid-state drive (SSD) could be used in addition to, or in place of, an HDD 1114.

Other internal or external storage can include at least one other storage device 1120 with storage media 1122 (e.g., a solid-state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can also be connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer 1150. The remote computer 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. The network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of these instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used, or modifications and additions can be made to the described implementation for performing the same or equivalent function of the corresponding implementation without deviating therefrom. Still further, multiple processing chips or multiple devices can share the performance of one or more functions described herein, and similarly, storage can be implemented across different devices. Accordingly, the various embodiments are not to be limited to any single implementation, but rather are to be construed in breadth, spirit, and scope in accordance with the appended claims.

What is claimed is:

1. A system, comprising:

at least one processor; and at least one memory that stores executable instructions that, when executed by the at least one processor, facilitate performance of operations, comprising:

ordering a set of customer information questionnaire (CIQ) files according to time stamps of the CIQ files, wherein the CIQ files specify configurations for deployment of a telco cloud;

based on the ordering, comparing attributes of different types of the configurations of the CIQ files to one another;

grouping the CIQ files according to comparison data resulting from the comparing and corresponding to the attributes, the grouping resulting in grouped CIQ files;

streamlining the grouped CIQ files by filtering the grouped CIQ files according to at least one of duplicate or conflicting, resulting in a consolidated set of the configurations, wherein the filtering comprises:

resolving an instance of conflict between a first configuration specified by a first CIQ file, of the grouped CIQ files, that conflicts with a second configuration specified by a second CIQ file, of the grouped CIQ files, wherein the second configuration is different from the first configuration, and wherein the second CIQ file is different from the first CIQ file, wherein a first time stamp corresponding to the first CIQ file is a more recent time stamp than a second time stamp, different from the first time stamp, corresponding to the second CIQ file, and wherein the resolving comprises, from the consolidated set of configurations, the second configuration; and generating a consolidated CIQ file that comprises the consolidated set of the configurations defining deployment criteria for the telco cloud, wherein the consolidated CIQ file is employable for generating a first telco cloud instance.

2. The system of claim 1, wherein the operations further comprise:

reading metadata associated with the consolidated CIQ file; and via cloud computing equipment, deploying the first telco cloud instance based on the consolidated CIQ file.

3. The system of claim 1, wherein the generating comprises:

generating the consolidated set of the configurations according to a format that is applicable to multiple hardware types and usable by different cloud computing equipment associated with different cloud computing service providers.

4. The system of claim 1, wherein the comparing comprises:

comparing different types of the configurations of the CIQ files to historical types of historical configurations and historical deployment results that are based on the historical configurations.

5. The system of claim 1, wherein the grouping comprises grouping the CIQ files according to the attributes of the configurations specified by the CIQ files, and wherein the filtering further comprises:

determining that a first CIQ file of the grouped CIQ files and a third CIQ file of the grouped CIQ files, that is different from the first and second CIQ file, are duplicate CIQ files, determining that a first time stamp corresponding to the first CIQ file is a more recent time stamp than a second time stamp, different from the first time stamp, corresponding to the third CIQ file, and resolving the duplicate CIQ files by including the first CIQ file having the more recent time stamp and excluding the third CIQ file from the consolidated CIQ file.

6. The system of claim 1, wherein the operations further comprise:

obtaining runtime properties associated with a second telco cloud instance, different from the first telco cloud instance, that has already been deployed; and as part of the generating, applying the runtime properties to the configuration of the CIQ files, resulting in the consolidated set of the configurations.

7. The system of claim 1, wherein the operations further comprise:

based on the consolidated set of the configurations, generating a deployment plan for the first instance of the telco cloud, wherein the deployment plan comprises at least a portion of the consolidated set of the configurations.

8. The system of claim 1, wherein the operations further comprise:

verifying that the consolidated CIQ file satisfies a specified schema comprising at least one rule to be satisfied by the consolidated CIQ file or at least one key performance indicator threshold to be satisfied by the consolidated CIQ file.

9. The system of claim 1, wherein the operations further comprise:

identifying a deficiency of a computing operation when accessing the first telco cloud instance; and in response to the identifying, automatically adjusting the consolidated set, absent input from a user entity associated with the system, of the configurations of the consolidated CIQ file based on the deficiency, thereby mitigating or eliminating the deficiency when a next telco cloud instance is deployed, via cloud computing equipment, based on the consolidated CIQ file.

10. The system of claim 1, wherein the operations further comprise:

updating the consolidated set of configurations to comprise day 0+ operational configurations for the first telco cloud instance having been deployed based on the consolidated CIQ file.

11. The system of claim 10, wherein the operations further comprise:

based on the consolidated set of configurations resulting from the updating, generating a deployment plan for a third telco cloud instance, other than the first telco cloud instance, that operates according the day 0+ operational configurations at day 0 of the third telco cloud instance, wherein the deployment plan comprises at least a portion of the consolidated set of the configurations.

12. A method, comprising:

based on an analysis of customer information questionnaire (CIQ) files, determining, by a system operatively coupled to at least one processor, configurations, comprising runtime attributes, usable to deploy a first telco cloud instance;

based on the configurations, streamlining the CIQ files comprising filtering the CIQ files to remove a configuration that comprises less than all configurations defining a first CIQ file of the CIQ files from a consolidated group of the configurations resulting from the filtering and defining deployment criteria for the first telco cloud instance;

generating a consolidated CIQ file that comprises the consolidated group of the configurations; and deploying, via cloud computing equipment, that is comprised by or communicatively couplable with the system, the first telco cloud instance based on the consolidated CIQ file.

13. The method of claim 12, further comprising:

prior to the generating of the consolidated CIQ file, ordering the CIQ files according to time stamps represented by metadata associated with the CIQ files.

14. The method of claim 12, wherein respective metadata associated with the CIQ files comprises information specifying respective drafters of the CIQ files.

15. The method of claim 12, further comprising:

resolving an instance of conflict between a first configuration specified by a first CIQ file, of the CIQ files, that conflicts with a second configuration specified by a second CIQ file, of the CIQ files, by employing, as part of the generating, only the CIQ file, of the first CIQ file and the second CIQ file, having a more recent time stamp, wherein the second configuration is different from the first configuration, and wherein the second CIQ file is different from the first CIQ file.

16. The method of claim 12, wherein the generating comprises:

generating the consolidated group of the configurations in accordance with a format applicable to a plurality of hardware types and a plurality of cloud computing service providers.

17. A non-transitory machine-readable medium, comprising executable instructions that, when executed by at least one processor facilitate performance of operations, comprising:

ordering a set of customer information questionnaire (CIQ) files according to time stamps of the CIQ files, wherein the CIQ files specify configurations for deployment of a telco cloud;

based on the ordering, comparing attributes of different types of the configurations of the CIQ files to one another, the comparing resulting in comparison data corresponding to the attributes;

based on the comparison data, grouping the CIQ files, resulting in grouped CIQ files;

streamlining the grouped CIQ files by filtering the grouped CIQ files to exclude a configuration that comprises less than all configurations defining a first CIQ file of the grouped CIQ files from a consolidated set of the configurations resulting from the filtering;

generating a consolidated CIQ file that comprises the consolidated set of the configurations defining deployment criteria for the telco cloud, comprising at least another configuration from the first CIQ file, at least the other configuration being different from the configuration having been excluded, wherein the consolidated CIQ file is employable for generation of a first telco cloud instance;

identifying a failure associated with the first telco cloud instance when accessing the first telco cloud instance cloud computing; and in response to the identifying of the failure, adjusting the consolidated CIQ file based on the failure, thereby overcoming the failure when the first telco cloud instance is re-deployed according to the consolidated CIQ file.

18. The non-transitory machine-readable medium of claim 17, wherein the operations further comprise:

at a specified frequency, merging a group of CIQ files comprising the consolidated CIQ file and comprising a second CIQ file, different from the first CIQ file, that comprises runtime property configurations associated with day 0+ operations of a second telco cloud instance, different from the first telco cloud instance, the merging comprising ordering the group of CIQ files according to respective time stamps of the group of CIQ files, the merging resulting in a merged CIQ file; and performing the adjusting of the consolidated CIQ file at least partially based on the merged CIQ file.

19. The non-transitory machine-readable medium of claim 17, wherein the adjusting of the consolidated CIQ file results in an adjusted version of the consolidated CIQ file, and wherein the operations further comprise:

deploying a second cloud instance, other than the first cloud instance, based on the adjusted version of the consolidated CIQ file.

20. The non-transitory machine-readable medium of claim 17, wherein the operations further comprise:

triggering an updating of the consolidated CIQ file based on obtaining a notification that a scale of use of the first cloud computing instance has changed.

* * * * *